US008619861B2

(12) United States Patent
Zuo et al.

(10) Patent No.: US 8,619,861 B2
(45) Date of Patent: Dec. 31, 2013

(54) TEXTURE SENSITIVE TEMPORAL FILTER BASED ON MOTION ESTIMATION

(75) Inventors: Peter X. Zuo, Kirkland, WA (US); Bruce Lin, Redmond, WA (US); Bharath Siravara, Redmond, WA (US); Walid Ali, Sammamish, WA (US)

(73) Assignee: Microsoft Corporation, Redmond, WA (US)

( * ) Notice: Subject to any disclaimer, the term of this patent is extended or adjusted under 35 U.S.C. 154(b) by 1365 days.

(21) Appl. No.: 12/037,925

(22) Filed: Feb. 26, 2008

(65) Prior Publication Data

US 2009/0213933 A1  Aug. 27, 2009

(51) Int. Cl.
*H04N 7/12* (2006.01)
*H04N 11/02* (2006.01)
*H04N 11/04* (2006.01)

(52) U.S. Cl.
USPC ............ 375/240.16; 375/240.01; 375/240.08; 375/240.29; 382/235; 382/236; 382/238; 382/239; 382/251; 382/253

(58) Field of Classification Search
USPC ........... 375/240.01, 240.08, 240.016, 240.29; 382/232–254
See application file for complete search history.

(56) References Cited

U.S. PATENT DOCUMENTS

| 6,483,874 | B1 | 11/2002 | Panusopone et al. | |
|---|---|---|---|---|
| 6,865,227 | B2 * | 3/2005 | Chan | 375/240.16 |
| 6,907,075 | B2 | 6/2005 | Felts et al. | |
| 6,954,500 | B2 * | 10/2005 | Bottreau | 375/240.16 |
| 6,980,595 | B2 | 12/2005 | Rose et al. | |
| 7,436,887 | B2 * | 10/2008 | Yeredor et al. | 375/240.01 |
| 7,817,209 | B2 * | 10/2010 | Tomonaga et al. | 348/669 |
| 7,865,026 | B2 * | 1/2011 | Chen et al. | 382/236 |
| 2005/0069212 | A1 * | 3/2005 | Bottreau et al. | 382/240 |
| 2006/0008000 | A1 | 1/2006 | Ye et al. | |
| 2006/0013309 | A1 | 1/2006 | Ha et al. | |
| 2006/0209961 | A1 * | 9/2006 | Han et al. | 375/240.16 |
| 2006/0245497 | A1 | 11/2006 | Tourapis et al. | |
| 2007/0002948 | A1 * | 1/2007 | Shibahara et al. | 375/240.12 |
| 2007/0053439 | A1 * | 3/2007 | Chen et al. | 375/240.24 |
| 2007/0237221 | A1 * | 10/2007 | Hsu et al. | 375/240.03 |
| 2008/0260278 | A1 * | 10/2008 | Zuo et al. | 382/251 |
| 2009/0168884 | A1 * | 7/2009 | Lu et al. | 375/240.16 |
| 2009/0213933 | A1 * | 8/2009 | Zuo et al. | 375/240.16 |

FOREIGN PATENT DOCUMENTS

FR            1845731 A1   10/2007
WO   WO 2007092255 A2 *  8/2007

OTHER PUBLICATIONS

Wei et al., "A Video Object Segmentation Scheme to Lower Complexity In Multi-View Video Coding", 2006.
Tosun, "Video Compression: MPEG-4 and Beyond", retrieved at <<http://www.cs.wustl.edu/~jain/cis788-99/compression/index.html>>.

\* cited by examiner

*Primary Examiner* — Benjamin H Elliott, IV

(57) ABSTRACT

Architecture that employs texture sensitive temporal filtering to reuse motion estimation information in a realtime encoder. The temporal filter is applied for classified static areas. The architecture reuses the motion estimation results on motion vectors, cost estimates (e.g., sum of absolute difference (SAD)), and edge awareness texture information to apply the temporal filter on the current picture. Filtering can be applied at the pixel level, block level or macroblock level.

12 Claims, 7 Drawing Sheets

TEXTURE SENSITIVE TEMPORAL FILTER BASED ON MOTION ESTIMATION

BACKGROUND

In realtime communications, bandwidth and computation complexity are two deciding factors for encoding algorithms, and eventually, encoding quality. Cameras with a variety of quality levels produce different levels of noise in the capturing process, which often increases bit-rate when encoding. Many temporal algorithms are proposed to try to reduce noise in the different levels. Some create ghost effects regardless of the motion. Other algorithms do a good job but at the expense of high computational complexity for estimating motion.

Thus, better video codec efficiency is desired that provides the same perceived video quality at the least possible bandwidth, and improves video quality by reducing noise, producing sharper edges, more vivid colors, and so on. Compression also needs to be more efficient at least with respect to reducing the bits per second to represent the same video data. Conventional techniques also introduce temporal noise across images thereby confusing the motion estimation. The codecs can then misunderstand the noise, and thus, consider the noise important motion vectors. Moreover, if the noise is not filtered out, bandwidth is expended on representing noise rather than real information.

SUMMARY

The following presents a simplified summary in order to provide a basic understanding of some novel embodiments described herein. This summary is not an extensive overview, and it is not intended to identify key/critical elements or to delineate the scope thereof. Its sole purpose is to present some concepts in a simplified form as a prelude to the more detailed description that is presented later.

The disclosed architecture employs a fast texture sensitive temporal filter to reuse motion estimation information in a realtime encoder, and applies the temporal filter for classified static areas. This at least addresses the ghost effects most conventional temporal filters introduce, as well as reducing the computational complexity of motion-driven temporal filters. The architecture reuses the motion estimation results on motion vectors, cost estimates (e.g., sum of absolute difference (SAD)), and edge awareness texture information to apply the temporal filter on the current picture.

To the accomplishment of the foregoing and related ends, certain illustrative aspects are described herein in connection with the following description and the annexed drawings. These aspects are indicative, however, of but a few of the various ways in which the principles disclosed herein can be employed and is intended to include all such aspects and equivalents. Other advantages and novel features will become apparent from the following detailed description when considered in conjunction with the drawings.

DETAILED DESCRIPTION

Figure 1:
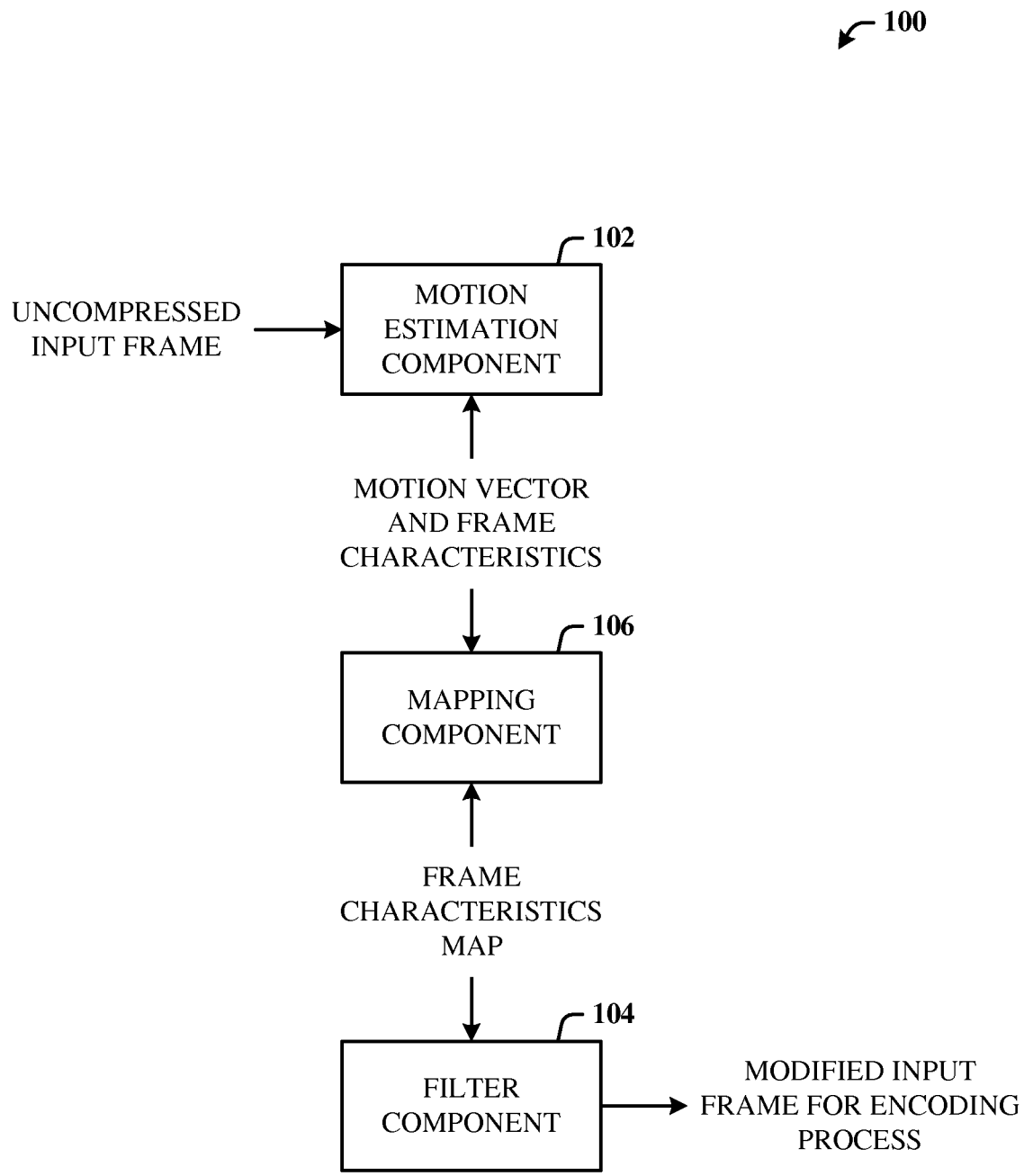
FIG. 1 illustrates an encoder system that employs temporal filtering based on motion estimation.

The disclosed architecture reuses information that currently is available for use by a codec. Additionally, detection fidelity is increased for distinguishing between noise and information, between pictures related to the picture, and noise that maybe interpreted as picture. These features are employed in the codec itself along with the encoder engine. The architecture includes a temporal noise filter that is integrated with the motion estimation part of the codec. As a result, in the context of video conferencing, video conferencing savings are realized in the static scene (no motion), medium motion activities (e.g., gestures, lip and facial expressions, minor speaker moves, etc.) and high motion activities (e.g., the speaker suddenly leaving the scene, sudden light changes, etc.).

Reference is now made to the drawings, wherein like reference numerals are used to refer to like elements throughout. In the following description, for purposes of explanation, numerous specific details are set forth in order to provide a thorough understanding thereof. It may be evident, however, that the novel embodiments can be practiced without these specific details. In other instances, well-known structures and devices are shown in block diagram form in order to facilitate a description thereof.

FIG. 1 illustrates an encoder system 100 that employs temporal filtering based on motion estimation. The system 100 includes a motion estimation component 102 for generating a motion vector and frame characteristics of an input frame. The system 100 also includes a filter component 104 for filtering a frame characteristics map of the frame characteristics and outputting a filtered (or modified) frame to an encoding process.

The frame characteristics can include a cost function, variance information, and/or texture information. The cost function can be a sum of absolute difference (SAD) cost function, rate distortion cost function, or other suitable cost function.

The frame characteristics map can be a static map or a dynamic map. Moreover, the frame characteristics can be defined at the pixel level, block level, or macroblock level, for example.

The system 100 can further include a mapping component 106 for generating the frame characteristics map based on the motion vector and the frame characteristics. The motion estimation component 102, the mapping component 106 and the filter component 104 can be part of an encoder that takes the uncompressed input frame and generate a compressed output frame.

Figure 2:
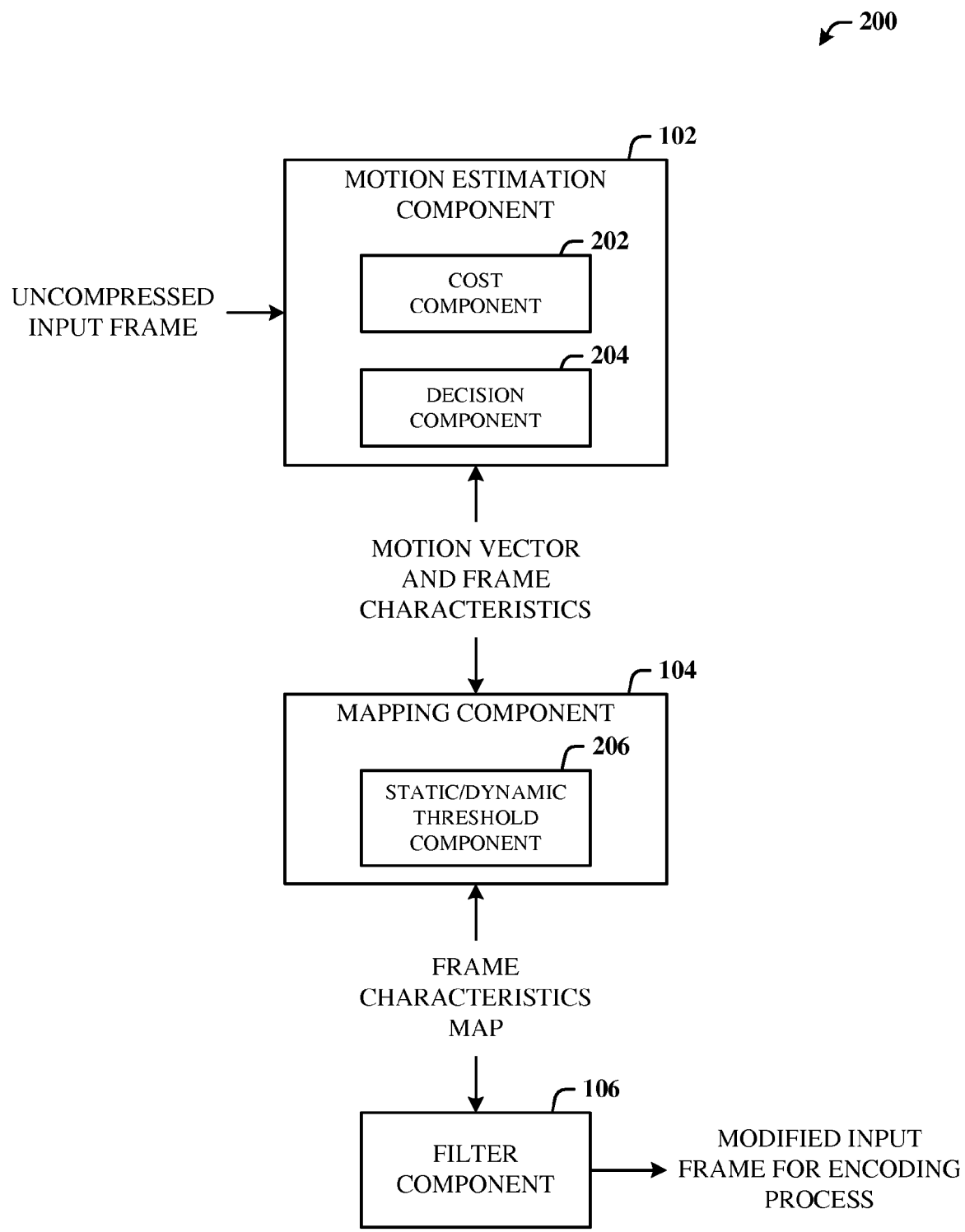
FIG. 2 illustrates a more detailed system that employs temporal filtering based on motion estimation.

FIG. 2 illustrates a more detailed system 200 that employs temporal filtering based on motion estimation. The motion estimation component 102 includes a cost component 202 for computing a cost associated with a motion vector. Different cost measures can be used, such as SAD, rate distortion cost, etc. To reduce the motion estimation complexity in real-time video encoder, SAD is typically used as a cost function. The best SAD for the block provides an inter-frame prediction measure.

The motion estimation component 102 includes a decision component 204 for determining if a block of the input frame is to be coded as intra-block or inter-block. To calculate the intra-block cost via the cost component 202, different cost measures can be used, such as block variance/deviation, or rate distortion cost. To reduce complexity in the realtime encoder, block variance can be used to represent the cost of intra-blocks. Since block variance in part reflects the texture level of the block, block variance is also referred as texture information in the encoder.

The mapping component 104 can further include a static dynamic threshold component 206 for determining if a block is static. A block is claimed as static only when the counter of the block exceeds a pre-defined threshold.

Figure 3:
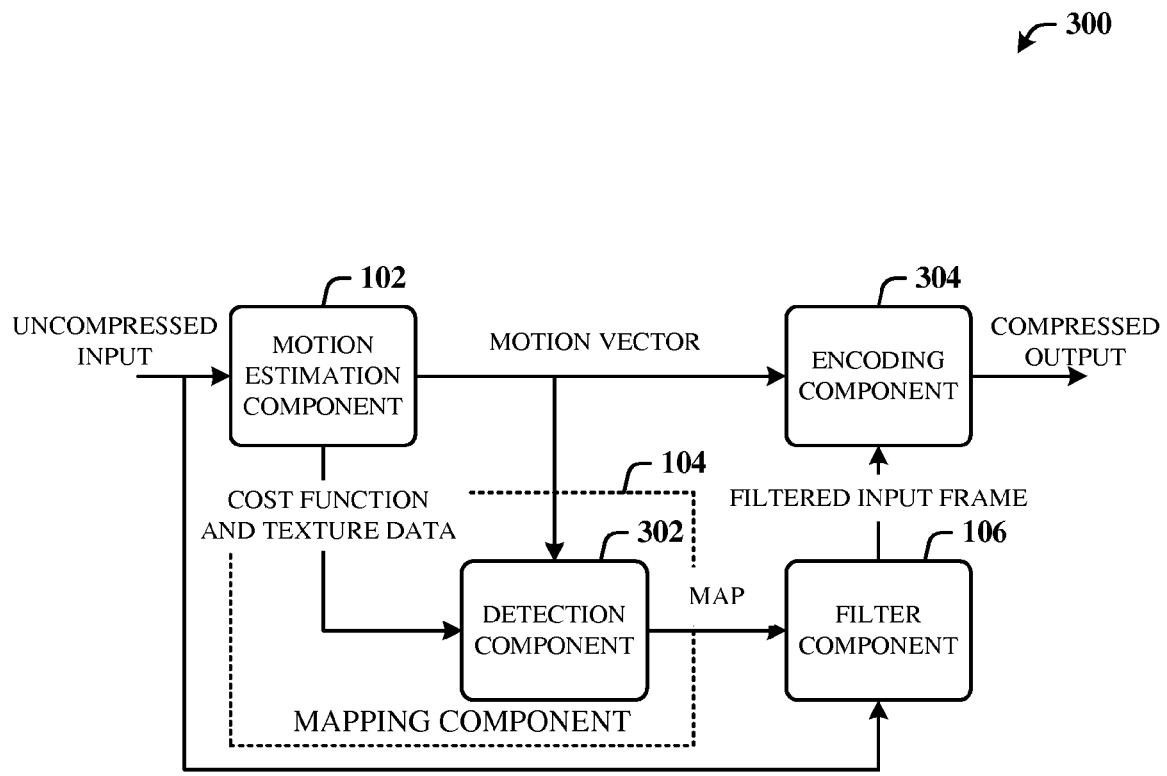
FIG. 3 illustrates an encoder system that employs texture sensitive temporal filtering.

FIG. 3 illustrates an encoder system 300 that employs texture sensitive temporal filtering. The process first uses motion estimation results of motion vector, SAD, and texture information to detect a static area, and from that, generates a map (e.g., static). Based on the map, temporal filtering is applied.

Static detection by a detection component 302 takes the input of the motion vector, the SAD, and the texture information for each block in current frame, and decides (in following algorithm) whether the current block is static. If the current block is static, a counter for that block increases by one; if not, the counter is reset to zero. The block is claimed as static only when the counter of the block exceeds the pre-defined threshold. Static detection does not require frame buffering.

A first step in the algorithm is to pre-generate the texture threshold for different SAD.

```
#define MIN_SADTEXT_TH      512
#define MAX_SADTEXT_TH     2048
for (Int iSAD=MIN_SADTEXT_TH+1;
    iSAD<=MAX_SADTEXT_TH; iSAD++)
        m_iFastSADTextureTable[iSAD-MIN_SADTEXT_TH-1] =
(Int)(0.005250876f * iSAD * iSAD - 3.958593594f * iSAD +
650.3143143f + 0.5f);
```

A second step in the algorithm is to update the block static counter according to block texture information, SAD and the motion vector.

```
for (imb=0; imb < pEncodeResultRecord->m_iMBX *
pEncodeResultRecord->m_iMBY; imb++)
{
    Int iSad = pEncodeResultRecord->m_pSAD[imb];
    Int iTexture;
    if (iSad <= 512)
        iTexture = -1;
    else
    if (iSad > MAX_SADTEXT_TH)
        iTexture = m_iFastSADTextureTable[MAX_SADTEXT_TH-
MIN_SADTEXT_TH-1];
    else
        iTexture =
m_iFastSADTextureTable[iSad-MIN_SADTEXT_TH-1];
    if ((abs(pEncodeResultRecord->m_pYMotion[imb])<=2 &&
abs(pEncodeResultRecord->m_pXMotion[imb])<=2) && iTexture <=
pEncodeResultRecord->m_pTexture[imb])
        {
            m_pMBBGFlag[imb]++;
            m_pMBBGFlag[imb] &= 0x0f;
        }
        else
            m_pMBBGFlag[imb]=0;
}
```

The motion vector threshold can be a half-pixel in both directions. Quarter-pixel motion estimation can be implemented, so the threshold of two is actually half-pixel.

The texture threshold is adaptive to SAD. An approximate two-degree polynomial function can be used to decide the texture threshold according to SAD. A pre-calculated lookup table can be employed to capture the mapping.

The decision as to whether the block is static is computed based on the pre-defined threshold. The pre-defined threshold is not smaller than the temporal filter length. In one implementation, a maximum of four frames is used in the temporal filter; thus, a value of four is used as the threshold for static detection.

The filter component 106 (e.g., temporal) can be applied on a block basis according to the map (e.g., static or dynamic). If the block is classified as static (the block static counter exceeds threshold), temporal filtering is employed. The number of frames being buffered (e.g., four, including the current frame) can be changed in different filtering strengths. An exemplary detailed algorithm for the code can be as follows:

```
Int avgY0   = 0;
Int avgY1   = 0;
Int avgY2   = 0;
Int avgY3   = 0;
Int avgU    = 0;
Int avgV    = 0;
for (iBuf=0; iBuf<iFrames; iBuf++) {
    avgY0 += (*pY[iBuf]) * iWeight[iBuf];
    avgY1 += *(pY[iBuf]+1) * iWeight[iBuf];
    avgY2 += *pYNextLine[iBuf] * iWeight[iBuf];
    avgY3 += *(pYNextLine[iBuf]+1) * iWeight[iBuf];
    avgU += *pU[iBuf] * iWeight[iBuf];
    avgV += *pV[iBuf] * iWeight[iBuf];
}
avgY0   = ROUND(Float(avgY0)  / iTotalWeight);
avgY1   = ROUND(Float(avgY1)  / iTotalWeight);
avgY2   = ROUND(Float(avgY2)  / iTotalWeight);
avgY3   = ROUND(Float(avgY3)  / iTotalWeight);
avgU    = ROUND(Float(avgU)   / iTotalWeight);
avgV    = ROUND(Float(avgV)   / iTotalWeight);
Int iDiffY0  = abs(avgY0 - *(pYCur));
Int iDiffY1  = abs(avgY1 - *(pYCur+1));
Int iDiffY2  = abs(avgY2 - *(pYCurNextLine));
Int iDiffY3  = abs(avgY3 - *(pYCurNextLine+1));
Int iDiffU   = abs(avgU - *(pUCur));
Int iDiffV   = abs(avgV - *(pVCur));
if (iDiffY0<iNoiseThY && iDiffY1<iNoiseThY &&
    iDiffY2<iNoiseThY && iDiffY3<iNoiseThY &&
    iDiffU <iNoiseThU && iDiffV <iNoiseThV)
{
    *(pYCur)      = PixelC(avgY0);
    *(pYCur+1)    = PixelC(avgY1);
    *(pYCurNextLine)    = PixelC(avgY2);
    *(pYCurNextLine+1)  = PixelC(avgY3);
    *(pUCur) = PixelC(avgU);
    *(pVCur) = PixelC(avgV);
}
```

Different weighting methodscan be used in the filter component 106. In one implementation, equal weight across the four frames (including current frame) can be used to simplify calculations and reduce computational complexity while not sacrificing filter quality.

The input to the encoder is raw (uncompressed) video. The encoding component 304 covers prediction, transformation, quantization, in-loop buffer, motion compensation and arithmetic encoding. The output of the encoder system 300 is compressed (encoded) video.

In general, the system 300 is a computer-implemented encoding system that comprises the motion estimation component 102 for generating a motion vector, cost function, and texture data from an input frame, a detection component 302 for creating a map of frame characteristics based on the motion vector, cost function, and texture data, a filter component 106 for filtering the frame characteristics map and outputting a filtered, and an encoding component 304 for encoding the motion vector and the filtered input frame to output a compressed frame.

The motion estimator component 102 includes a cost component (e.g., cost component 202 of FIG. 2) that employs a SAD cost function or a rate distortion cost function, for example. The detection component 302 includes a predetermined threshold (as defined by the threshold component 206 of FIG. 2) that defines if the map is static or dynamic. The motion estimation component 102 codes the frame characteristics of the input frame as a block that is inter-block or intra-block.

Following is a series of flow charts representative of exemplary methodologies for performing novel aspects of the disclosed architecture. While, for purposes of simplicity of explanation, the one or more methodologies shown herein, for example, in the form of a flow chart or flow diagram, are shown and described as a series of acts, it is to be understood and appreciated that the methodologies are not limited by the order of acts, as some acts may, in accordance therewith, occur in a different order and/or concurrently with other acts from that shown and described herein. For example, those skilled in the art will understand and appreciate that a methodology could alternatively be represented as a series of interrelated states or events, such as in a state diagram. Moreover, not all acts illustrated in a methodology may be required for a novel implementation.

Figure 4:
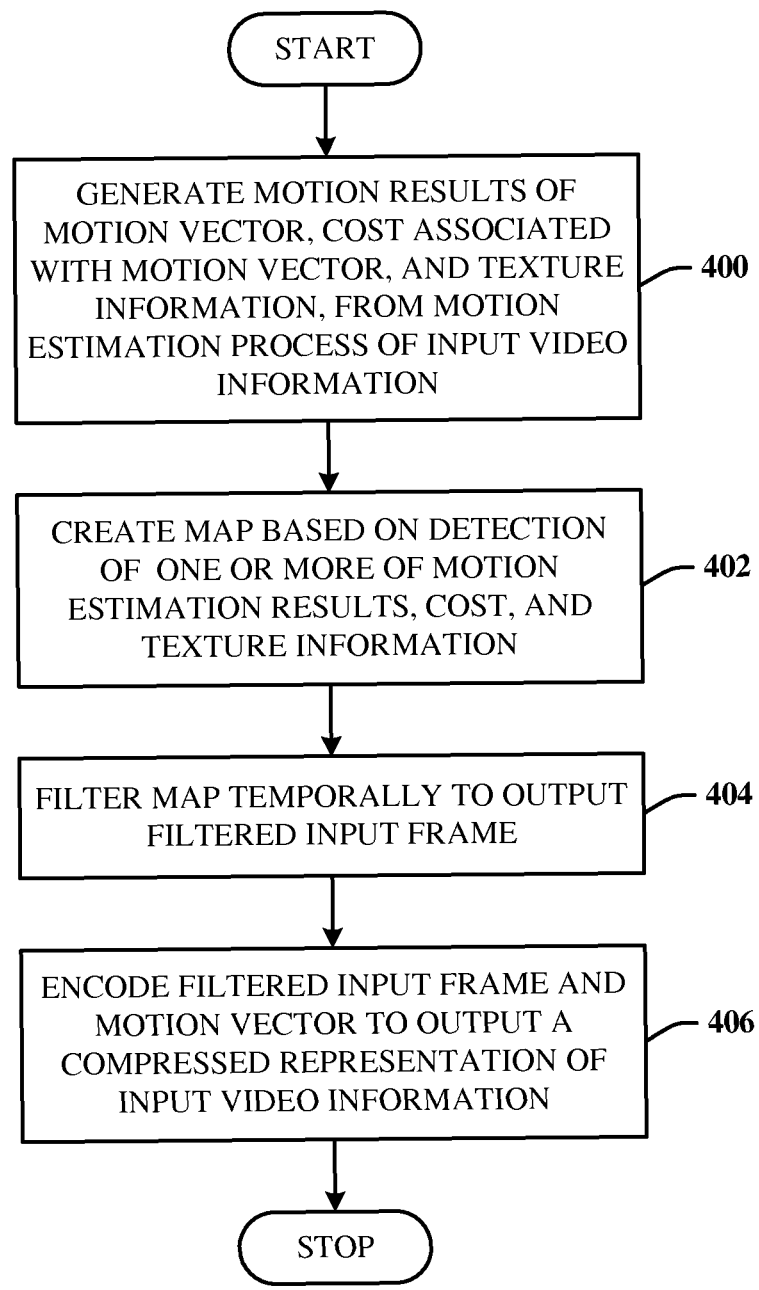
FIG. 4 illustrates a computer-implemented method of encoding a picture.

FIG. 4 illustrates a computer-implemented method of encoding a picture. At 400, motion estimation results of a motion vector, a cost associated with the motion vector, and texture information are generated from a motion estimation process of input video information. At 402, a map is created based on detection of one or more of the motion estimation results, the cost, and the texture information. At 404, the map is filtered temporally to output a filtered input frame. At 406, the filtered input frame and the motion vector are encoded to output a compressed representation of the video input information.

Figure 5:
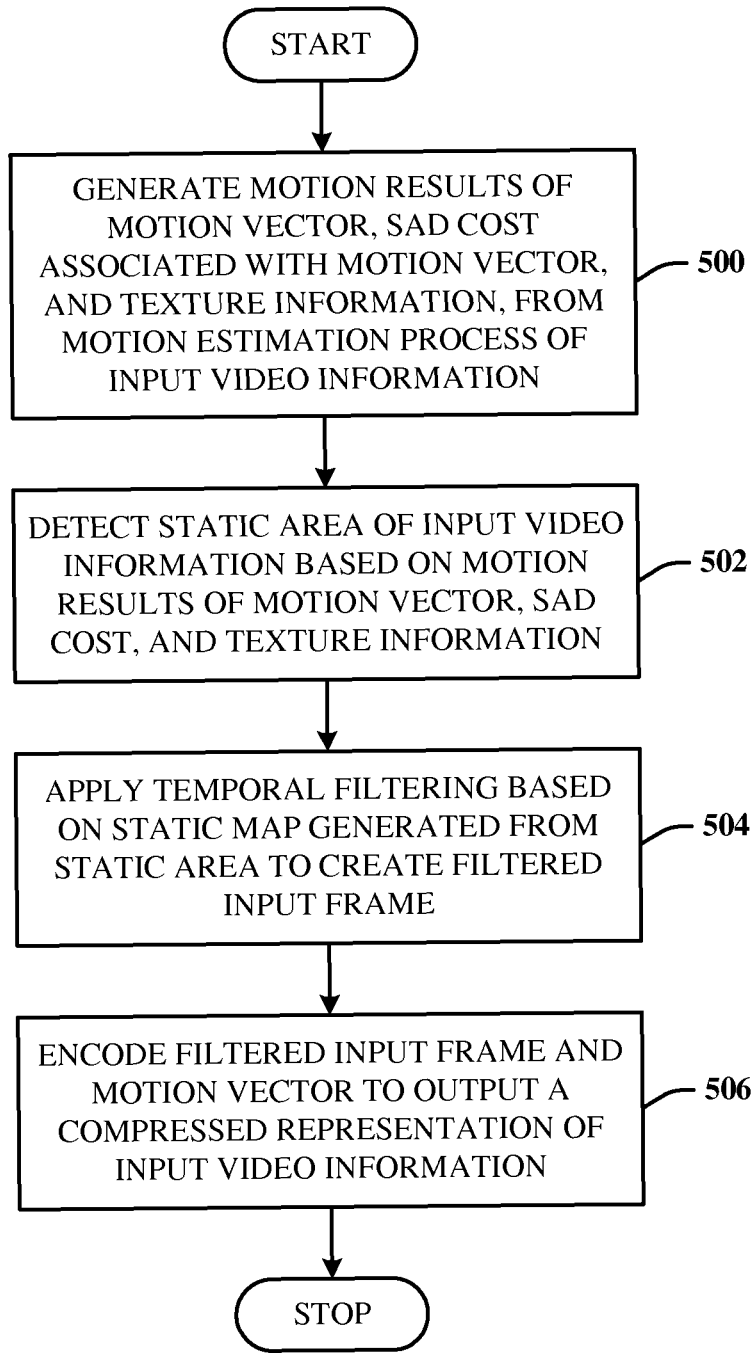
FIG. 5 illustrates an alternative method of encoding a picture.

FIG. 5 illustrates an alternative method of encoding a picture. At 500, motion estimation results of a motion vector, a SAD cost associated with the motion vector, and texture information are generated from a motion estimation process of input video information. At 502, a static area of the input video information is detected based on the motion estimation results, the SAD cost, and texture information. At 504, temporal filtering is applied to the static map generated from the static area to create an input frame. At 506, the input frame is encoded to output a compressed representation of the video input information.

Figure 6:
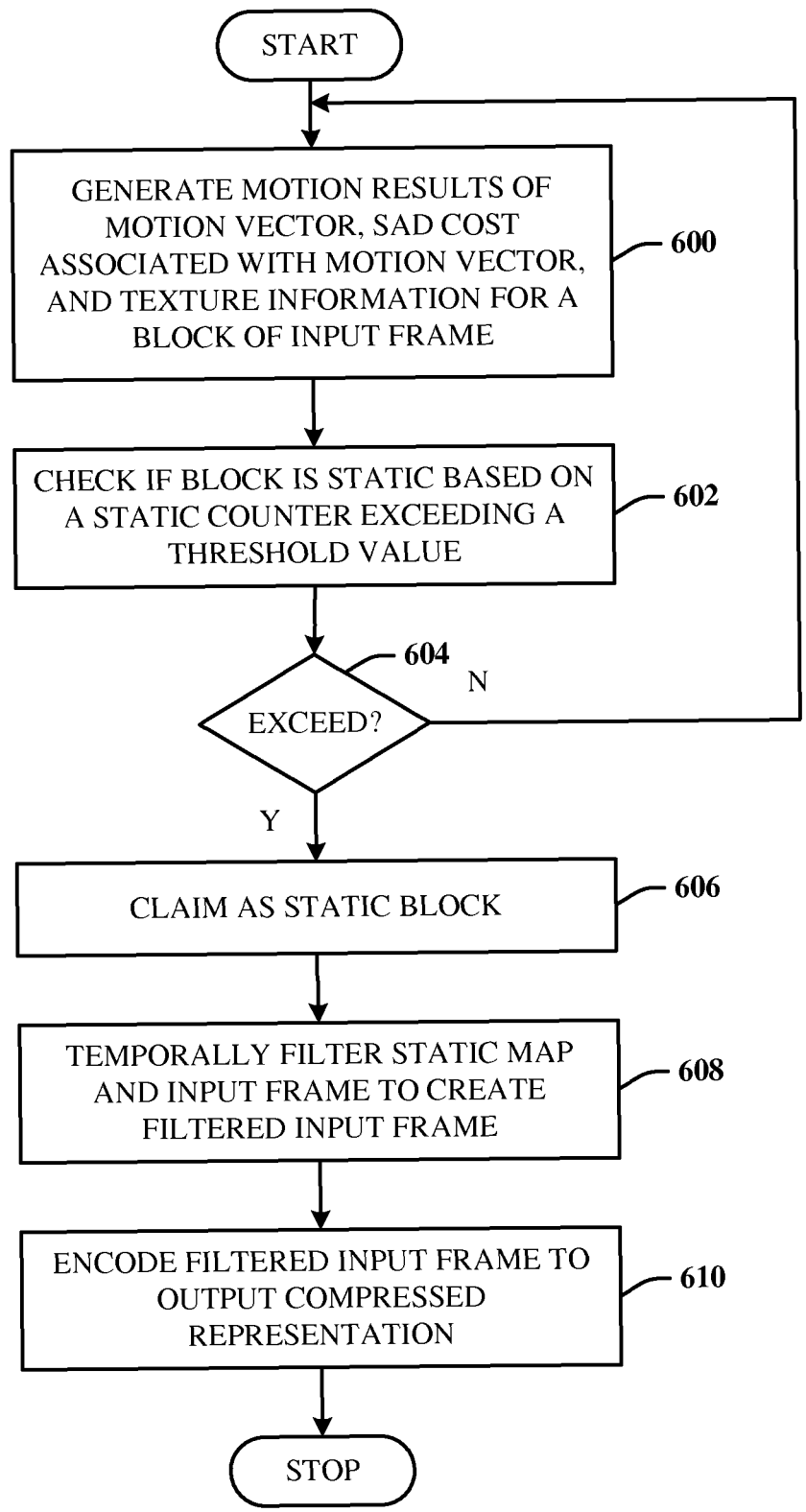
FIG. 6 illustrates a method of determining if a block of an input frame is static.

FIG. 6 illustrates a method of determining if a block of an input frame is static. At 600, motion estimation results of a motion vector, a SAD cost associated with the motion vector, and texture information are generated for a block of an input frame. At 602, a check is made to determine if the block is static based on a static counter exceeding a threshold value. At 604, if the counter exceeds the threshold value, flow is to 606 to claim the block as static. At 608, the static map of the block and the input frame are temporally filtered to create a filtered input frame. At 610, the filtered input frame is encoded to output a compressed representation of the input frame. If the threshold has not been exceeded, flow is from 604 to the input of 600 to continue with block processing.

As used in this application, the terms "component" and "system" are intended to refer to a computer-related entity, either hardware, a combination of hardware and software, software, or software in execution. For example, a component can be, but is not limited to being, a process running on a processor, a processor, a hard disk drive, multiple storage drives (of optical and/or magnetic storage medium), an object, an executable, a thread of execution, a program, and/or a computer. By way of illustration, both an application running on a server and the server can be a component. One or more components can reside within a process and/or thread of execution, and a component can be localized on one computer and/or distributed between two or more computers.

Figure 7:
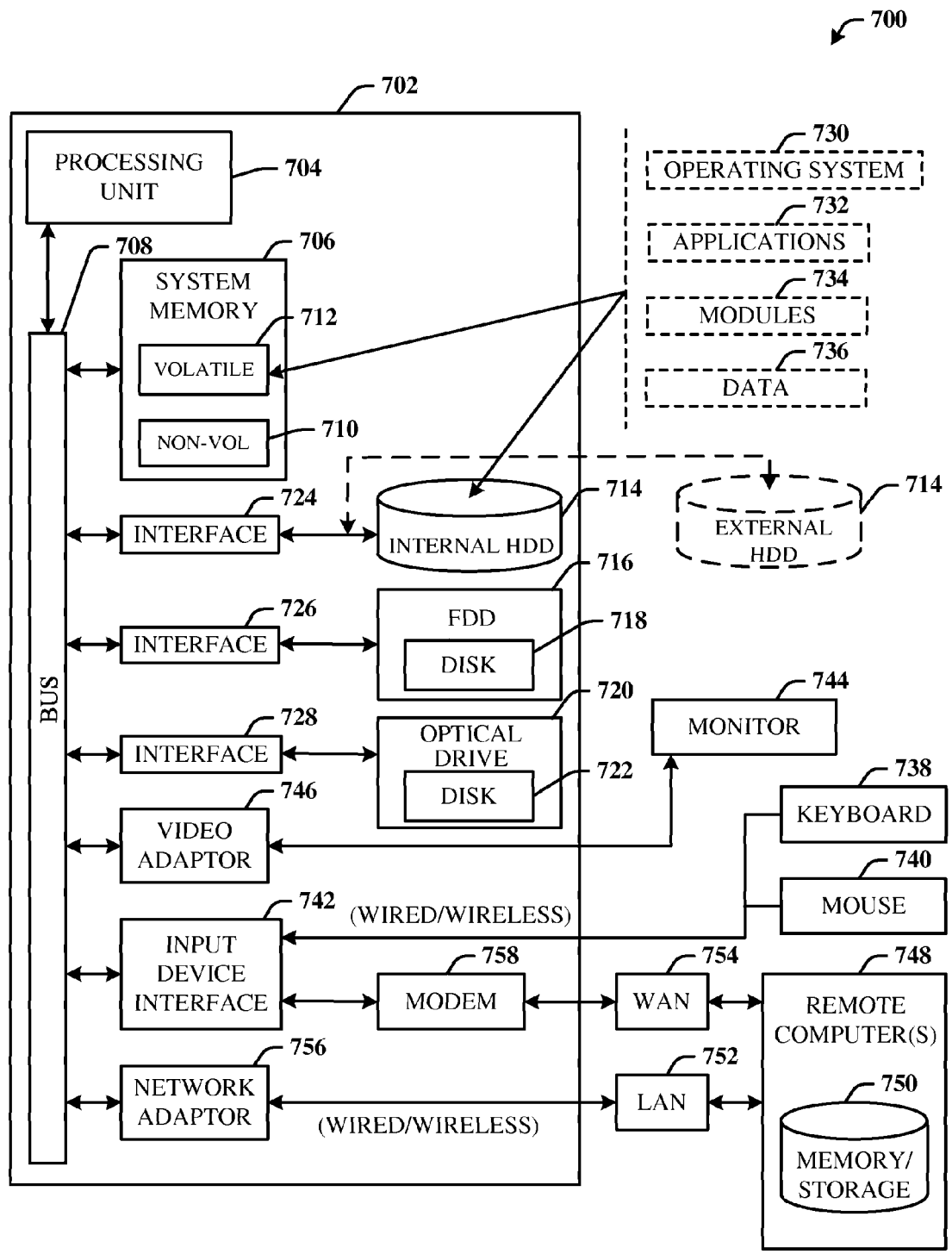
FIG. 7 illustrates a block diagram of a computing system operable to execute texture sensitive temporal filtering in accordance with the disclosed architecture.

Referring now to FIG. 7, there is illustrated a block diagram of a computing system 700 operable to execute texture sensitive temporal filtering in accordance with the disclosed architecture. In order to provide additional context for various aspects thereof, FIG. 7 and the following discussion are intended to provide a brief, general description of a suitable computing system 700 in which the various aspects can be implemented. While the description above is in the general context of computer-executable instructions that may run on one or more computers, those skilled in the art will recognize that a novel embodiment also can be implemented in combination with other program modules and/or as a combination of hardware and software.

Generally, program modules include routines, programs, components, data structures, etc., that perform particular tasks or implement particular abstract data types. Moreover, those skilled in the art will appreciate that the inventive methods can be practiced with other computer system configurations, including single-processor or multiprocessor computer systems, minicomputers, mainframe computers, as well as personal computers, hand-held computing devices, microprocessor-based or programmable consumer electronics, and the like, each of which can be operatively coupled to one or more associated devices.

The illustrated aspects can also be practiced in distributed computing environments where certain tasks are performed by remote processing devices that are linked through a communications network. In a distributed computing environment, program modules can be located in both local and remote memory storage devices.

A computer typically includes a variety of computer-readable media. Computer-readable media can be any available media that can be accessed by the computer and includes volatile and non-volatile media, removable and non-removable media. By way of example, and not limitation, computer-readable media can comprise computer storage media and communication media. Computer storage media includes volatile and non-volatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital video disk (DVD) or other optical disk storage, magnetic cassettes, magnetic tape, magnetic disk storage or other magnetic storage devices, or any other medium which can be used to store the desired information and which can be accessed by the computer.

With reference again to FIG. 7, the exemplary computing system 700 for implementing various aspects includes a computer 702 having a processing unit 704, a system memory 706 and a system bus 708. The system bus 708 provides an interface for system components including, but not limited to, the system memory 706 to the processing unit 704. The processing unit 704 can be any of various commercially available processors. Dual microprocessors and other multi-processor architectures may also be employed as the processing unit 704.

The system bus 708 can be any of several types of bus structure that may further interconnect to a memory bus (with or without a memory controller), a peripheral bus, and a local bus using any of a variety of commercially available bus architectures. The system memory 706 can include non-volatile memory (NON-VOL) 710 and/or volatile memory 712 (e.g., random access memory (RAM)). A basic input/output system (BIOS) can be stored in the non-volatile memory 710 (e.g., ROM, EPROM, EEPROM, etc.), which BIOS are the basic routines that help to transfer information between elements within the computer 702, such as during start-up. The volatile memory 712 can also include a high-speed RAM such as static RAM for caching data.

The computer 702 further includes an internal hard disk drive (HDD) 714 (e.g., EIDE, SATA), which internal HDD 714 may also be configured for external use in a suitable chassis, a magnetic floppy disk drive (FDD) 716, (e.g., to read from or write to a removable diskette 718) and an optical disk drive 720, (e.g., reading a CD-ROM disk 722 or, to read from or write to other high capacity optical media such as a DVD). The HDD 714, FDD 716 and optical disk drive 720 can be connected to the system bus 708 by a HDD interface 724, an FDD interface 726 and an optical drive interface 728, respectively. The HDD interface 724 for external drive implementations can include at least one or both of Universal Serial Bus (USB) and IEEE 1394 interface technologies.

The drives and associated computer-readable media provide nonvolatile storage of data, data structures, computer-executable instructions, and so forth. For the computer 702, the drives and media accommodate the storage of any data in a suitable digital format. Although the description of computer-readable media above refers to a HDD, a removable magnetic diskette (e.g., FDD), and a removable optical media such as a CD or DVD, it should be appreciated by those skilled in the art that other types of media which are readable by a computer, such as zip drives, magnetic cassettes, flash memory cards, cartridges, and the like, may also be used in the exemplary operating environment, and further, that any such media may contain computer-executable instructions for performing novel methods of the disclosed architecture.

A number of program modules can be stored in the drives and volatile memory 712, including an operating system 730, one or more application programs 732, other program modules 734, and program data 736. The one or more application programs 732, other program modules 734, and program data 736 can include the system 100, system 200, system 300 and methods of FIGS. 4-6, for example.

All or portions of the operating system, applications, modules, and/or data can also be cached in the volatile memory 712. It is to be appreciated that the disclosed architecture can be implemented with various commercially available operating systems or combinations of operating systems.

A user can enter commands and information into the computer 702 through one or more wire/wireless input devices, for example, a keyboard 738 and a pointing device, such as a mouse 740. Other input devices (not shown) may include a microphone, an IR remote control, a joystick, a game pad, a stylus pen, touch screen, or the like. These and other input devices are often connected to the processing unit 704 through an input device interface 742 that is coupled to the system bus 708, but can be connected by other interfaces such as a parallel port, IEEE 1394 serial port, a game port, a USB port, an IR interface, etc.

A monitor 744 or other type of display device is also connected to the system bus 708 via an interface, such as a video adaptor 746. The video adaptor 746 can include the system 100, system 200, system 300 and methods of FIGS. 4-6, for example, to operate on video information received into the computing system 702.

In addition to the monitor 744, a computer typically includes other peripheral output devices (not shown), such as speakers, printers, etc.

The computer 702 may operate in a networked environment using logical connections via wire and/or wireless communications to one or more remote computers, such as a remote computer(s) 748. The remote computer(s) 748 can be a workstation, a server computer, a router, a personal computer, portable computer, microprocessor-based entertainment appliance, a peer device or other common network node, and typically includes many or all of the elements described relative to the computer 702, although, for purposes of brevity, only a memory/storage device 750 is illustrated. The logical connections depicted include wire/wireless connectivity to a local area network (LAN) 752 and/or larger networks, for example, a wide area network (WAN) 754. Such LAN and WAN networking environments are commonplace in offices and companies, and facilitate enterprise-wide computer networks, such as intranets, all of which may connect to a global communications network, for example, the Internet.

When used in a LAN networking environment, the computer 702 is connected to the LAN 752 through a wire and/or wireless communication network interface or adaptor 756. The adaptor 756 can facilitate wire and/or wireless communications to the LAN 752, which may also include a wireless access point disposed thereon for communicating with the wireless functionality of the adaptor 756.

When used in a WAN networking environment, the computer 702 can include a modem 758, or is connected to a communications server on the WAN 754, or has other means for establishing communications over the WAN 754, such as by way of the Internet. The modem 758, which can be internal or external and a wire and/or wireless device, is connected to the system bus 708 via the input device interface 742. In a networked environment, program modules depicted relative to the computer 702, or portions thereof, can be stored in the remote memory/storage device 750. It will be appreciated that the network connections shown are exemplary and other means of establishing a communications link between the computers can be used.

The computer 702 is operable to communicate with wire and wireless devices or entities using the IEEE 802 family of standards, such as wireless devices operatively disposed in wireless communication (e.g., IEEE 802.11 over-the-air modulation techniques) with, for example, a printer, scanner, desktop and/or portable computer, personal digital assistant (PDA), communications satellite, any piece of equipment or location associated with a wirelessly detectable tag (e.g., a kiosk, news stand, restroom), and telephone. This includes at least Wi-Fi (or Wireless Fidelity), WiMax, and Bluetooth™ wireless technologies. Thus, the communication can be a predefined structure as with a conventional network or simply an ad hoc communication between at least two devices. Wi-Fi networks use radio technologies called IEEE 802.11x (a, b, g, etc.) to provide secure, reliable, fast wireless connectivity. A Wi-Fi network can be used to connect computers to each other, to the Internet, and to wire networks (which use IEEE 802.3-related media and functions).

What has been described above includes examples of the disclosed architecture. It is, of course, not possible to describe every conceivable combination of components and/or methodologies, but one of ordinary skill in the art may recognize that many further combinations and permutations are possible. Accordingly, the novel architecture is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. An encoder system, comprising:
a memory;
a processing unit operatively coupled to the memory, the processing unit executing:
a motion estimation component for generating frame characteristics and a motion vector from an input frame, the frame characteristics comprising a cost function and texture data, the motion estimation component to determine whether to code the frame characteristics of an area of the input frame as a block that is inter-block or intra-block;
a detection component for pre-generating a texture threshold for different cost functions, taking the input of the motion vector, the cost function, and the texture information for each area in the input frame and updating a block static counter according to the texture information, the cost function and the motion vector, and determining that a current area of the input flame is static when the block static counter for the area exceeds the predetermined texture threshold value defining whether the area is static or dynamic;
a mapping component for generating a static map from the static area; and
a filter component for temporally filtering the input frame when the area is static, using the static map of the area and outputting a filtered frame to an encoding process.

2. The system of claim 1, wherein the motion estimation component, the mapping component and the filter component are part of an encoder.

3. The system of claim 1, the motion estimation component to generate variance information from the input frame.

4. The system of claim 1, wherein the cost function is a sum of absolute differences (SAD) cost function.

5. The system of claim 1, wherein the cost function and texture data are defined at the pixel level.

6. A computer-implemented encoding system, comprising:
a memory;
a processing unit operatively coupled to the memory, the processing unit executing:
a motion estimation component for generating frame characteristics comprising a motion vector, cost function, and texture data from an input frame, the motion estimation component to determine whether to code the frame characteristics of the input frame as a block that is inter-block or intra-block;
a detection component for pre-generating a texture threshold for different cost functions, taking the input of the motion vector, the cost function, and the texture information for each block in the input frame and updating a block static counter according to the texture information, the cost function and the motion vector, and creating a frame characteristics map based on the motion vector, cost function, and texture data, the detection component comprising the predetermined texture threshold value that defines if the frame characteristics map is static or dynamic and determining that a current block of the input frame is static when the block static counter for the block exceeds the predetermined texture threshold value;
a filter component for temporally filtering static blocks in the frame characteristics map and outputting a filtered frame; and
an encoding component for encoding the motion vector and the filtered input frame to output a compressed frame.

7. The system of claim 6, wherein the motion estimator component includes a cost component that employs a SAD cost function.

8. A computer-implemented method of encoding a picture, comprising:
generating motion estimation results comprising a motion vector, a cost associated with the motion vector, and texture information from a motion estimation process of input video information;
determining whether to code the motion estimation results of the input video information as a block that is inter-block or intra-block;
pre-generating a texture threshold for different cost functions;
taking the input of the motion vector, the cost function, and the texture information for each area in the input frame and updating a block static counter according to the texture information, the cost function and the motion vector;
determining that a current block of the input frame is static when the block static counter for the block exceeds the predetermined texture threshold value defining whether the area is static or dynamic;
creating a frame characteristics map based on detection of one or more of the motion estimation results, the cost, and the texture information;
filtering static blocks in the frame characteristics map temporally, to output a filtered input frame; and
encoding the filtered input frame and the motion vector to output a compressed representation of the input video information.

9. The method of claim 8, wherein the texture information includes edge awareness information.

10. The method of claim 8, wherein the frame characteristics map is created for each block of a current frame based on the motion vector, the cost, and the texture information.

11. The method of claim 8, further comprising applying weights across multiple frames as part of filtering the frame characteristics map.

12. The method of claim 8, further comprising employing block variance as the textual information for intra-block.

* * * * *